United States Patent Office

3,839,376
Patented Oct. 1, 1974

1

3,839,376
PROCESS FOR OXIDIZING EPOXIDES TO ACIDS
Ming Nan Sheng, Cherry Hill, N.J., assignor to Atlantic Richfield Company, New York, N.Y.
No Drawing. Filed Nov. 9, 1972, Ser. No. 305,203
Int. Cl. C08h 17/36
U.S. Cl. 260—413
8 Claims

ABSTRACT OF THE DISCLOSURE

A process for the catalytic oxidation of an epoxide such as, octene-1-oxide, cyclohexeneoxide, octene-2-oxide, etc. which comprises cleavage of the carbon to carbon linkage of the heterocyclic ring and one of the oxygen bonds of the heterocyclic ring to form two moles of a carboxylic acid by treating the epoxide with a catalyst of ruthenium or a ruthenium compound such as, ruthenium metal, ruthenium trichloride and ruthenium dioxide; a peracid oxidizing agent such as, peracetic acid, performic acid, etc. and an inert organic solvent such as, a paraffinic hydrocarbon or a halogenated hydrocarbon (heptane, hexane, etc.) at the reflux temperature of the solvent.

BACKGROUND OF THE INVENTION

The present invention relates to a process for the catalytic oxidation of epoxides to produce carboxylic acids. More specifically, the present invention relates to a process for oxidizing epoxides to produce fatty acids in the presence of ruthenium or a ruthenium compound, an oxidizing agent and an inert organic solvent.

Fatty acids have heretofore been used commercially for the manufacture of synthetic lubricants and soaps. Consequently, the market for such fatty acids has generally exceeded the ability of industry to supply these materials from their natural sources. There is, therefore, a substantial demand for such fatty acids, particularly those having long carbon chains.

In the past, numerous processes have been developed for the production of fatty acids from various related materials. For example, fatty acids have been produced by catalytic or non-catalytic oxidation of various olefins primarily, primary olefins and cyclic olefins. In one such process, as disclosed in U.S. Pat. 2,585,129, a primary olefin is oxidized with hydrogen peroxide in the presence of peracetic acid to produce the corresponding saturated dihydroxy hydrocarbon. Thereafter the dihydroxy compound is selectively oxidized with periodic acid to cause cleavage between the acid contiguous hydroxylated carbons to thereby form a fatty aldehyde which in turn is further oxidized with peracetic acid to form the corresponding fatty acid. It has also been proposed in the past to treat various alcohols such as, primary alcohols with an oxidizing agent in the presence of catalysts such as, ruthenium to produce the corresponding fatty acids. Here again the conversion is generally quite low. Therefore, these processes have not been completely successful to the extent that a substantial amount of starting material is necessary to obtain a limited amount of product.

However, with all the work which has been done in this area, it has not heretofore been suggested that fatty acids can be produced in a single stage and in high yields by the oxidation of epoxides. The explanation for this appears to be that it was not considered possible to cleave both a carbon to carbon single bond as opposed to a double bond as well as an oxygen bond of a heterocyclic ring. Consequently, there has been no suggestion or intimation in the prior art that this reaction is possible and that epoxides can be effectively and directly converted to a fatty acid.

It is therefore an object of the present invention to provide a process for producing high yields of fatty acids from epoxides. Another and further object is to provide an improved process for the conversion of epoxides to fatty acids in the presence of a ruthenium catalyst and an oxidizing agent. Another and further object of the present invention is to provide an improved process for the conversion of epoxides to fatty acids in the presence of a ruthenium catalyst and a peracid as an oxidizing agent. Still another object of the present invention is to provide an improved process for the conversion of epoxides to fatty acids in the presence of a ruthenium catalyst, an oxidizing agent and an inert organic solvent.

These and other objects and advantages of the present invention will be apparent from the following detailed description.

SUMMARY OF THE INVENTION

Epoxides are converted to fatty acids by contacting the epoxide with a peracid oxidizing agent, a ruthenium-containing catalyst, and thereafter recovering fatty acids from the reaction mixture.

DESCRIPTION OF THE INVENTION

In accordance with the present invention epoxides are converted to fatty acids in the presence of a ruthenium catalyst and an oxidizing agent. While it is not intended that the invention be limited to any particular theory, it is believed that the oxidation causes cleavage of the carbon to carbon bond of the contiguous carbon atoms of the heterocyclic ring and one of the oxygen bonds of the heterocyclic ring to form two moles of acids in accordance with the following equation:

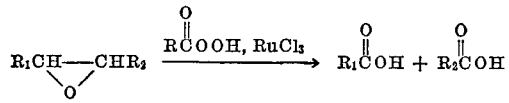

wherein $R_1$ and $R_2$ are alike or different straight or branched chain alkyl radicals, aryl radicals, cycloalkyl radicals, alkaryl radicals, aralkyl radicals or hydrogen. Preferred $R_1$ and $R_2$ alkyl radicals contain from 1 to about 20 carbon atoms such as ethyl, butyl, octyl and decyl; preferred $R_1$ cycloalkyl radicals when $R_2$ is hydrogen contain about 4 to 6 carbon atoms and include cyclobutyl, cyclopentyl and cyclohexyl; preferred $R_1$ and $R_2$ aryl radicals include phenyl and naphthyl; suitable $R_1$ and $R_2$ aralkyl radicals include phenylethyl and naphthylbutyl wherein the alkyl portion of the aralkyl radical may contain from 1 to about 6 carbon atoms; preferred $R_1$ and $R_2$ alkaryl radicals include tolyl and methylnaphthyl and include alkyl substitutes of 1 to about 6 or more carbon atoms. Suitable epoxides which can be utilized as starting materials in accordance with the present invention include oxirane group-containing compounds such as, alpha- and internal olefins, and cyclic epoxides such as, propylene oxide, butene-1-oxide, octene-1-oxide, octene-2-oxide, cyclohexeneoxide, etc.

The catalyst utilized in accordance with the present invention is ruthenium metal or an organic or inorganic ruthenium compound. Any organic or inorganic ruthenium salt having an anion which does not unduly retard the formation of the desired products by an extraneous side reaction can be utilized as a catalyst. Salts of fatty acids having up to about four carbon atoms are preferred organic salts, for example, ruthenium-formate, -acetate, -propionate and -butyrate. Inorganic salts in general and simple inorganic salts in particular constitute a highly preferred class of ruthenium-containing catalysts. Ruthenium salts of halogens including such ruthenium halides as ruthenium trichloride are particularly preferred. In addition to the above, organo-metallic compounds such as, bis(cyclopentadienyl) ruthenium and ruthenium carbonyls such as, $Ru(CO)_5$, $Ru_2(CO)_9$, $[Ru(CO)_4]_3$, $Ru(CO)X$ wherein X is chlorine, bromine or iodine may also be employed as catalysts. A wide variety of ruthenium chelates are also applicable in the present process. Preferred chelates have a donor atom selected from the group consisting of group V–B and group VI–B elements of the Periodic Table. Chelating agents with a donor atom selected from the class consisting of nitrogen and oxygen are also applicable. Tri-amines, tetra-amines and oximes comprise a class of useful chelating agents having nitrogen as a donor atom. Dibasic carboxylic acids comprise a class of chelating agents having an oxygen as a donor atom. Thus, chelates derived from well-known chelating agents such as, salicylic acid, α-acyloin oxime, α-benzoin oxime, dimethylglyoxime, acetylacetone, aminoacetic acid, oxalic acid, diethylene triamine, triethylenetetraamine, malonic acid, and the like can be employed. Illustrative examples of such chelates include $Na_3[Ru(C_2O_4)_3] \cdot 6H_2O$,

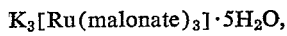

$K_3[Ru(malonate)_3] \cdot 5H_2O$, tris(ethylenediamine)ruthenium$^{III}$, and the like.

Of the ruthenium-containing materials listed above ruthenium metal, ruthenium trichloride and ruthenium dioxide are the most highly preferred. When ruthenium metal or ruthenium dioxide or other ruthenium compounds that are not soluble in an organic solvent are employed, it is preferred that the ruthenium-containing material be in a fine state of subdivision.

The amount of catalyst to be utilized in accordance with the present invention is between about 0.00001 and 1.0% by weight of the reaction mixture. Preferably, the amount of catalyst is between about 0.0001 and 0.001% by weight of the reaction mixture.

The oxidizing agent in accordance with the present invention is peracid. Where the term "peracid" is utilized in the present application this term is meant to include materials as defined in *The Condensed Chemical Dictionary*, 6th Edition, Reinhold and Company, 1956. In accordance with this definition, peracids are derivatives of hydrogen peroxide, the molecules of which contain one or more directly linked pairs of oxygen atoms, —O—O—. These peracids do not include permanganic, perchloric and periodic acids. Suitable peracids for use in accordance with the present invention are peracetic, performic, perphthalic, persuccinic, persulfuric, perboric, trichloroperacetic, trifluoroperacetic, perbenzoic, m-chloroperbenzoic, p-nitroperbenzoic, etc. Perferably, the peracid is a percarboxylic acid.

The oxidizing agent should be used in amounts sufficient to accomplish complete oxidation of the epoxide. For this purpose the oxidizing agent should be used in amounts calculated to supply between about 0.9 and 3.2 mole equivalents of oxygen per mole of epoxide.

The process is carried out in the presence of an inert organic solvent. In general, any inert solvent not susceptible to oxidation can be utilized. Preferred solvents are solvents selected from the group consisting of paraffinic hydrocarbons, halogenated hydrocarbons and the like, preferably having a boiling range of about 40° to 100° C. Suitable solvents include hexane, heptane, chloroform, carbon tetrachloride, etc.

In the event that the oxidizing agent or the catalyst is not readily miscible with the solvent, the reaction mixture may be advantageously agitated.

The process of the present invention is preferably carried out under atmospheric pressure and at the reflux temperature of the solvent. However, when the epoxide feed material has a lower boiling point than the solvent, it is preferable to carry out the reaction under pressure. Any pressure above atmospheric may be utilized but pressures within the range of about 50 to 500 p.s.i.g. are preferred.

The following working examples illustrate the operation of the process of the present invention.

Example I

Octene-1-oxide (20 g.), $RuCl_3 \cdot 1-3H_2O$ (0.05 g.) and heptane (100 ml.) were placed in a 1 liter, three-neck flask equipped with an addition funnel, a thermometer, a mechanical stirrer and a reflux condenser. The reaction mixture was stirred to obtain a homogeneous dispersion of the $RuCl_3$ in the organic solvent. At this time, 100 g. of 40% by weight peracetic acid was added. An exothermic reaction occurred. The peracid was added in such a way as to keep the mixture refluxing at a temperature of about 82° C. After the addition was completed, the reaction mixture was allowed to reflux for an additional hour and was then cooled to room temperature. The reaction mixture formed two phases and the phases were separated. The acid phase was extracted with two 100 ml. portions of heptane. The combined heptane fractions were washed with 100 ml. of water to secure a complete elimination of the acetic acid. The heptane layer was concentrated to a residue. The residue was analyzed by gas chromatography for fatty acid and found to contain 9.7 g. of heptanoic acid and 0.4 g. of octanoic acid.

Example II

The experimental procedure of Example I was repeated with the exception that hexane was used as a solvent. The reaction temperature in this instance was maintained at about 64° C. The product was found to contain 0.9 g. hexanoic acid, 10.0 g. heptanoic acid and 0.5 g. octanoic acid.

While specific materials and techniques have been set forth in the present disclosure and exemplified by specific examples, it is to be understood that various modifications and variations will be apparent to one skilled in the art. Accordingly, the present invention is to be limited only in accordance with the appended claims.

I claim:

1. A process for the production of carboxylic acids comprising, contacting an epoxide of an α-olefin with a percarboxylic acid oxidizing agent in the presence of a ruthenium-containing catalyst selected from the group consisting of ruthenium metal, inorganic ruthenium salt, and organic ruthenium salts and an inert paraffinic or halogenated hydrocarbon solvent said process being carried out at the reflux temperature of said solvent and recovering carboxylic acids from the reaction mixture.

2. The process in accordance with Claim 1 wherein the epoxide has a boiling point below the boiling point of the solvent and the reaction is carried out at a pressure above atmospheric.

3. A process in accordance with Claim 1 wherein the catalyst is a ruthenium salt of a carboxylic acid having up to four carbon atoms.

4. A process in accordance with Claim 1 wherein the catalyst is a ruthenium salt of a halogen.

5. A process according to Claim 1 wherein the epoxide is selected from the group consisting of propylene oxide, butene-1-oxide and octene-1-oxide.

6. A process according to Claim 1 wherein the ruthenium-containing catalyst is ruthenium trichloride or ruthenium dioxide.

7. A process according to Claim 1 wherein the percarboxylic acid oxidizing agent is selected from the group consisting of peracetic, performic, perphthalic, persuccinic, tricholorperacetic and trifluoroperacetic.

8. A process according to Claim 1 wherein the solvent is selected from the group consisting of hexane, heptane, chloroform and carbon tetrachloride.

References Cited

UNITED STATES PATENTS 3,275,662   9/1966   Gash _____ 260—348.5

FOREIGN PATENTS 900,107   7/1962   Great Britain _____ 260—343.6

LEWIS GOTTS, Primary Examiner

E. G. LOVE, Assistant Examiner

U.S. Cl. X.R.

260—514 R, 515 R, 533 R, 540